United States Patent

[11] 3,604,080

| [72] | Inventor | Ira Eugene Smith<br>Lancaster, Pa. |
|---|---|---|
| [21] | Appl. No. | 3,299 |
| [22] | Filed | Jan. 16, 1970 |
| [45] | Patented | Sept. 14, 1971 |
| [73] | Assignee | RCA Corporation |

[54] METHOD FOR MAKING AN ELECTRON-TUBE GRID ASSEMBLY
5 Claims, 8 Drawing Figs.

[52] U.S. Cl. ................................................. 29/25.14,
29/25.16, 29/25.18, 219/69 D, 219/69 E, 219/69 M, 51/318
[51] Int. Cl. ................................................. H01j 9/00
[50] Field of Search ......................................... 29/25.13,
25.15, 25.16, 25.18, 25.14, 25.1, 25.11; 219/69 M, 69 V, 69 D, 69 E

[56] References Cited
UNITED STATES PATENTS

| 2,980,984 | 4/1961 | Shrader et al. | 51/318 X |
| 3,251,641 | 5/1966 | Gaylord | 29/25.14 X |
| 3,467,807 | 9/1969 | Livshits et al. | 219/69 D |
| 3,469,057 | 9/1969 | Maines | 219/69 D |

Primary Examiner—John F. Campbell
Assistant Examiner—Richard Bernard Lazarus
Attorney—Glenn H. Bruestle ABSTRACT: A method for making an electron tube grid assembly comprises mounting in a concentric, radially spaced relationship at least one set of a plurality of thin-walled hollow cylindrical electrode grid blanks, the blanks defining internal chambers therebetween and a central internal chamber. Then, radially aligned apertures are cut in the blanks by electrical discharge machining, whereby small particles of material are produced. The particles are flushed away from the cutting region by a continuous directed stream of fluid through each of the internal chambers and over the external surfaces at least in the cutting region.

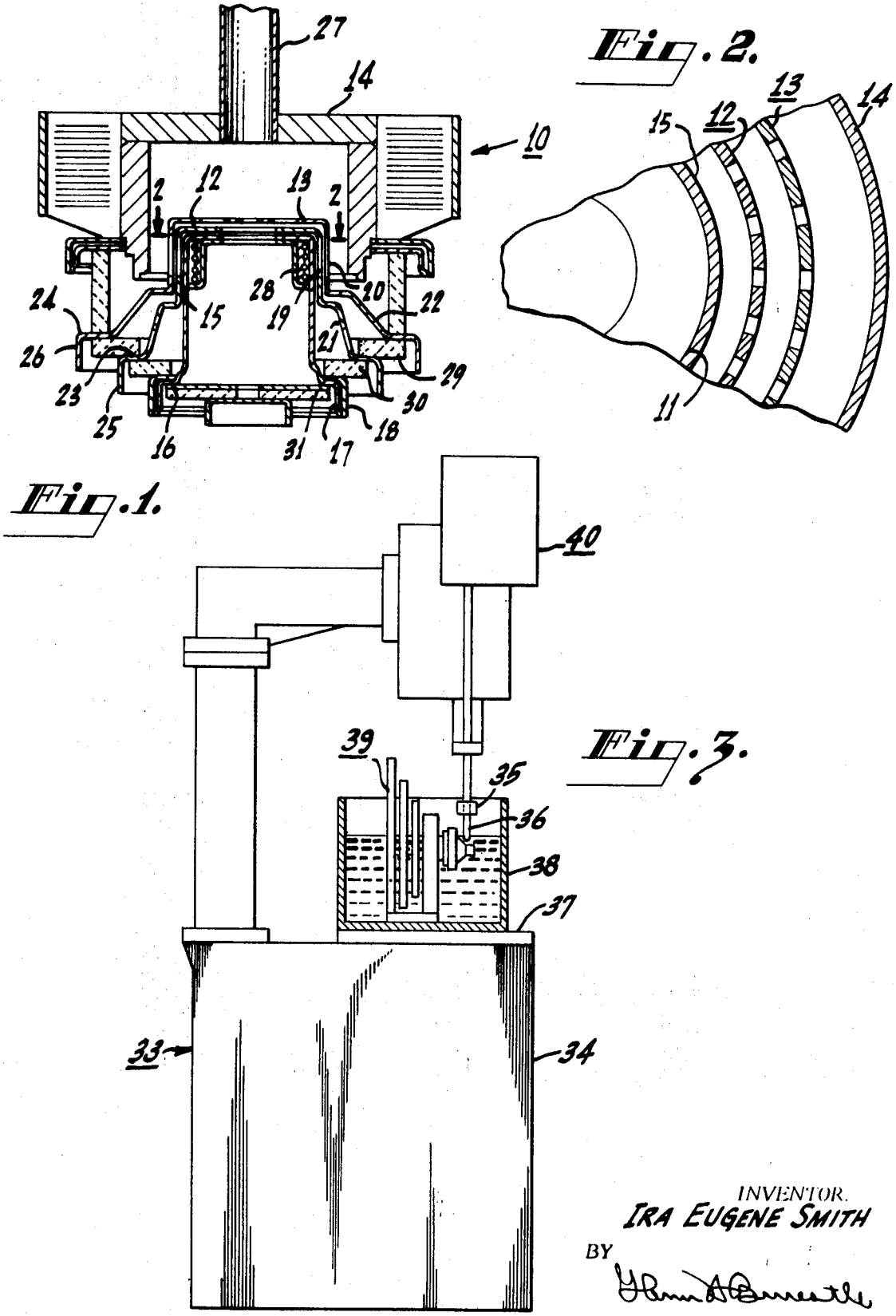

INVENTOR.
IRA EUGENE SMITH
BY
Attorney

INVENTOR.
IRA EUGENE SMITH
BY
Attorney

METHOD FOR MAKING AN ELECTRON-TUBE GRID ASSEMBLY

BACKGROUND OF THE INVENTION

The invention relates to a new method for fabricating electron grid assemblies by electrical discharge machining. The invention relates particularly to an improved method of cutting radially aligned apertures in a plurality of concentric radially spaced grid blanks using a combination of an improved external fluid flow over the grid assembly and internal fluid flow between the grid blanks to remove particles produced during the cutting of the apertures.

One prior art method of making an electron tube grid assembly by electrical discharge machining is described in U.S. Pat. No. 2,980,984 to M. B. Shrader et al. This patent describes a method wherein apertures are cut in radially spaced grid blanks comprising the grid assembly by electrical discharge machining. The grid assembly is submerged in a circulating fluid and the circulation of the fluid removes particles produced during the cutting step. Another prior art method of electrical discharge machining of grid assemblies uses a combination of the circulating fluid and a submerged fluid stream directed towards the cutting region to remove cutaway particles.

Ideally, the prior art methods remove all of the particles produced in cutting the apertures. In practice, however, the circulating fluid flows in eddies around the grid assembly, and there are stagnant fluid areas or areas with very limited fluid flow in the chambers between the grid blanks. Some of the particles are recirculated to the cutting area and internal chambers by the fluid eddy flows, and interfere with the cutting process.

It is desirable to produce apertures in the control and screen grid that have wall surfaces that are accurately aligned in a radial direction. The presence of particles in the fluid at the cutting region sometimes creates improper voltage paths from the cutting electrode through these particles to the grid blank. This causes nonuniform cutting action and results in holes, burrs, or other discontinuities of the grid's aperture walls. The discontinuities of the aperture walls cause a radial misalignment of the apertures. This misalignment interferes with the straight line emission between the cathode and the anode and permits the emission to strike the screen grid walls. The emission striking the screen grid walls results in increased screen grid current and correspondingly decreases the operating efficiency of the tube.

SUMMARY OF THE INVENTION

The novel method for fabricating an electron tube grid assembly includes mounting in a permanent concentric, insulative-spaced relationship at least one set of a plurality of thin cylindrical grid blanks, said blanks defining chambers between the blanks and an internal central chamber. At least one set of radially aligned apertures is then cut in said blanks by electrical discharge machining, whereby small particles of material are produced. The small particles produced during the cutting operation are removed by directed streams of fluid through each of the chambers.

Unlike previous methods, the novel method provides continuous directed external and internal flows of a fluid stream through the chambers defined by the grid blanks, and over at least the aperture cutting region. This ensures prompt removal of small metal particles produced during aperture cutting. The removal of the particles eliminates nonuniform electrode arcing which occurs when small particles are not removed from the cutting region. This permits a uniform cutting action and produces smooth wall and more nearly burr-free apertures resulting in improved tube efficiency.

The novel method also results in an economy in cutting successive apertures of a grid assembly sequentially in a continuous operation and at a faster rate than was achieved in previous processes.

DESCRIPTION OF DRAWINGS

1.
FIG. 1 is a sectional side elevational view of a novel electron tube having an electron grid assembly made by the novel method.
2.
FIG. 2 is an enlarged sectional plan view along section line 2—2 of a portion of the tube shown in FIG. 1 illustrating emission paths.
3.
FIG. 3 is a partial sectional side elevational view of an electrical discharge machine used for fabricating electron grid assemblies by the novel process.
4.

DESCRIPTION OF PREFERRED EMBODIMENT

Figure 4:
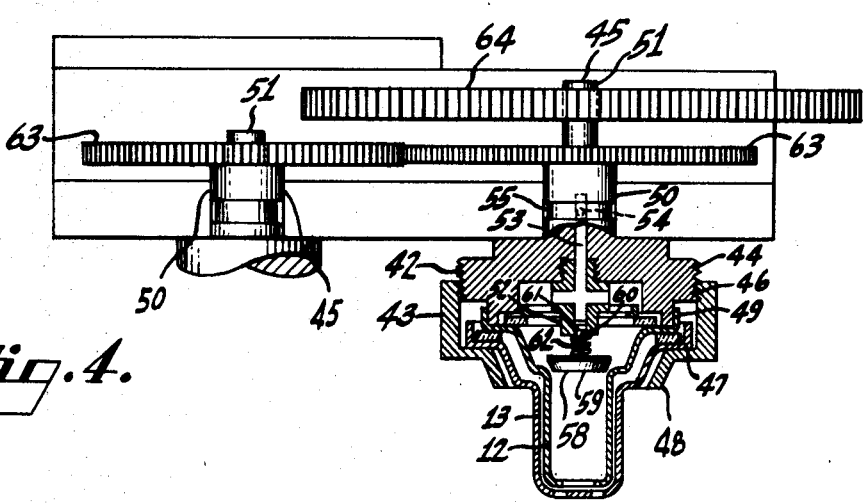
FIG. 4 is a partial sectional plan view of a two position fixture used for simultaneously fabricating two electron grid assemblies by the novel method.
5.

FIG. 1 illustrates a novel electron tube 10 comprised of a cylindrical cathode 11, a control grid 12, a screen grid 13, and an anode 14, all arranged in a concentric grouping. The cathode 11 includes a tubular sleeve member having at one end an emissive coating 15 and at the other end a radial flange 16 having at its periphery an axially extending tubular portion 17. The flange 16 and the tubular portion 17 are adapted to be mounted in a cathode mounting cup 18 so that the cathode may be inserted in the tube in a predetermined spaced relationship to the control grid 12 after assembly of the vacuum envelope portions of the tube. The control grid 12 and the screen grid 13 comprise, respectively, electron-active cylindrical portions 19 and 20, conical tubular support portions 21 and 22, radial flanges 23 and 24, and outer tubular terminal contacts 25 and 26. The anode 14 comprises a cuplike member disposed over and surrounding the cathode and grids. A metal tubulation 27, brazed to the top of the anode 14 serves as a means for evacuation of the tube 10. The tubulation 27 is sealed, as by cold welding, after evacuation. A heater element 28 is positioned inside the cathode 11 adjacent the emissive coating 15. The cathode 11, control grid 12, screen grid 13, and anode 14 are all held in a predetermined insulative spaced relationship to each other by a series of annular ceramic rings 29, 30 and 31 sealed respectively to the radial flange portions of those members. A heat radiator 32 is mounted concentric to the anode.

In the operation of the tube 10 shown in FIG. 1, electrons emitted from the cathode 11 travel in a generally radial direction to the anode 14 passing through radially aligned apertures in the control grid 12 and screen grid 13. Burrs and discontinuities in the aperture wall cause the electron emission to strike the conductive portions of the screen grid 13 resulting in increased screen grid current. The elimination of burrs and discontinuities permits the electrons which pass through the control grid 12 apertures to also pass through the apertures in the screen grid 13 rather than impinging upon a conductive element. FIG. 2 illustrates the radial alignment between the electron-active portion 19 of the control grid 12 and the electron-active portion 20 of the screen grid 13.

The blank control grid 12 and the blank screen grid 13 are first mounted in their ultimate spaced relationship to each other. A blank grid assembly consists of at least a blank control grid 12, a blank screen grid 13, and a separating annular ring-shaped insulator 29 mounted in their final coaxial relationship to each other. Apertures may be cut in the blank grid assembly in accordance with the novel method which will be described.

Figure 5:
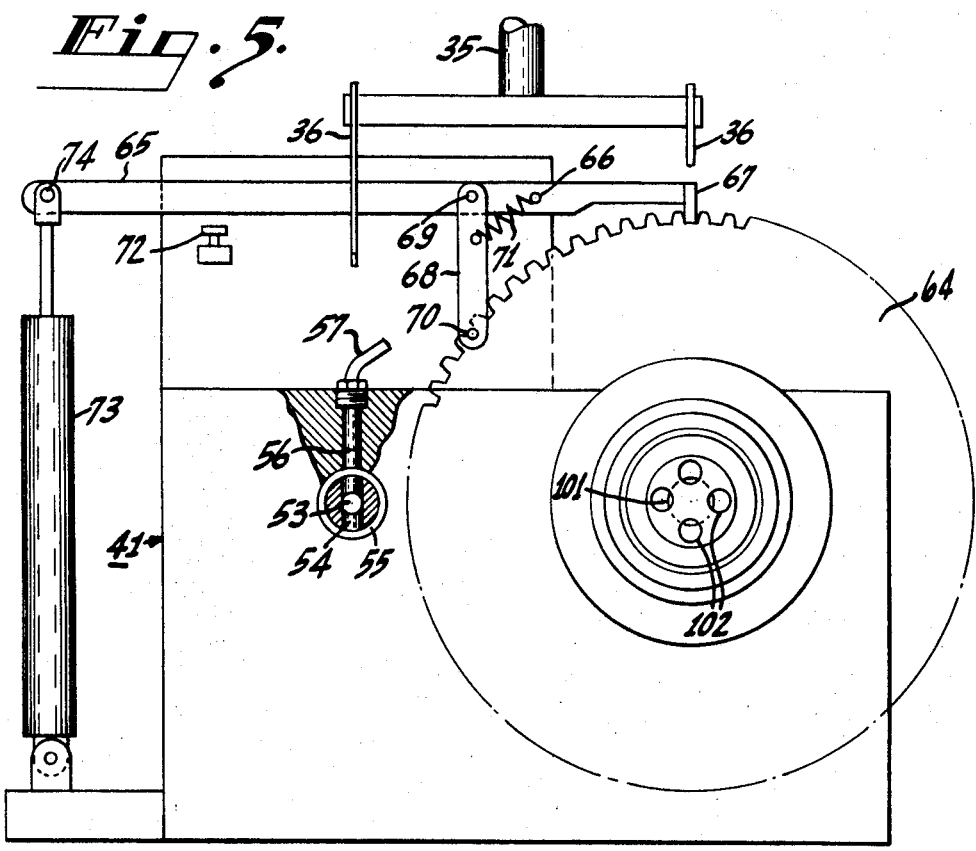
FIG. 5 is a side elevational view of the fixture shown in FIG. 4.
6.
Figure 6:
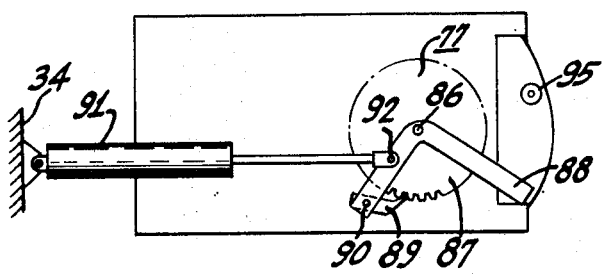
FIG. 6 is a partial plan view of the cycle control used for continuous sequential fabrication of electron grid assemblies by the novel process.
7.
Figure 7:
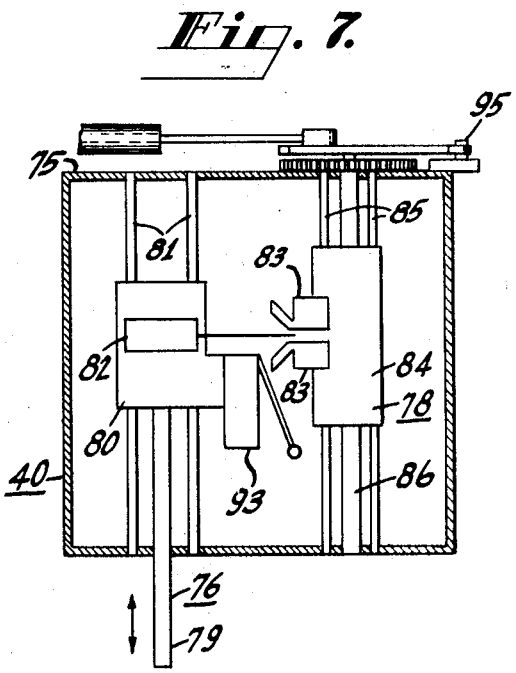
FIG. 7 is a sectional elevational view of the cycle control shown in FIG. 6.
8.

FIG. 3 illustrates an electrical discharge machine 33 which is well known in the prior art. The machine includes a main frame 34, a vertical-operated tool holder 35 with two cutting electrodes 36, a work table 37 supporting a tank 38 for containing the dielectric fluid, and electrical control means (not shown). A grid assembly fixture 39 as shown in FIGS. 4 and 5 is mounted in the dielectric tank 38. A cycle control 40, which mounts over the tool holder 35 to operate from the movement of the tool holder 35, is shown in FIGS. 6 and 7.

The fixture 39 shown in FIGS. 4 and 5 includes a fixture frame 41 on which two grid chucks 42 are rotatably mounted. Each chuck 42 includes a front retainer 43, a hub 44, and a shaft 45. The retainer 43 and the hub 44 are engaged by a thread 46. The retainer 43 includes a flat washer-shaped portion 47 to contact the radial flange 24 of the screen grid 13, and a tapered conical portion 48 to conform to, and be spaced from, the conical tubular support portion 22. The hub 44 includes an extended ring-shaped portion 49 to concentrically retain and support the contact 25 and the radial flange 23 of the control grid 12. The shaft 45 has a large-diameter center portion 50 and a small diameter end portion 51. A fluid nozzle 52 is coaxially positioned in the hub 44. The nozzle 52 communicates with a fluid pump (not shown) through the shaft 45 by an axial hole 53, a radial hole 54 and a circumferential groove 55. The groove 55 communicates to a fluid pump and fluid filter (not shown) through a hole 56 in the fixture frame 41 and connecting tubing 57. A spring-actuated grid-centering unit 58 includes a tapered disc 59 and a rod 60 with an enlarged rod end 61. The rod slides in the nozzle 52, and a spring 62 positioned between the nozzle 52 and the centering unit 58 maintains the centering unit 58 in the extended position. Two gears 63 of equal diameter and equal number of teeth are mounted on the small diameter end position 51 of each shaft 45. An index gear 64 is also mounted on the small diameter portion 51 of one shaft 45. A lever 65 is pivotally mounted to the fixture frame 41 at the first pivot 66. An index lock 67 is attached to one end of the lever 65 and engages with the index gear 64. An index link 68 attaches to the lever 65 at a second pivot 69. The index link 68 engages the index gear 64 at an index pin 70. An extension spring 71 attaches between the index link 68 and the first pivot 66 to retain the index pin 70 engaged with the index gear 64 during index and to allow repositioning of the index pin after index. A stop 72 is attached to the fixture frame 41 to limit the stroke of the lever 65 to obtain the correct angular rotation of the index gear 64. A first pneumatic cylinder 73 pivotally attaches between the fixture frame 41 and the lever 65 at a third pivot 74. The cycle control 40 shown in FIGS. 6 and 7 includes a casing 75, a tool movement control 76, a tool wear compensator 77, and an index cycle control 78. The tool movement control 76 includes a contact rod 79 which mounts against the tool holder 35. The contact rod 79 attaches to a switch-mounting block 80 and is vertically guided on a first pair of guide rods 81. The stroke control includes a "whisker switch" 82 mounted on the block 80 and an adjustable slotted actuator 83. The tool wear compensator 77 includes an actuator block 84 guided vertically on a second pair of guide rods 85 and moved vertically by a lead screw 86. A cycle gear 87 attaches to the upper end of the lead screw 86 as shown. An angled lever 88 pivots over the end of the lead screw 86. A latch 89 is connected at a fourth pivot 90 on one end of the lever and a second pneumatic cylinder 91 attached to the angled lever 88 at the fifth pivot 92. The index cycle control 78 includes an index switch 93 attached to the switch-mounting block 80. An adjustable stop 95 controls the stroke of the angled lever to adjust for the amount of tool wear.

In using the electrical discharge machine 33 to cut apertures in grid blanks, the grid assembly is mounted in the fixture 39 and submerged in a tank filled with dielectric fluid. The cutting electrode 36 is supported and advanced close to the exterior of the blank at the position of the desired aperture. A pulsating DC voltage is applied between the tool and grid blank. With the tool close to the exterior grid blank, a series of electrical discharges causes portions of the grid blanks to be vaporized or eroded away over an area directly opposite and corresponding to the shape of the tool. During the cutting process, the electrical discharges also cause particles to be produced from the cutting electrode and grid blanks. In the cutting process, it is important that the tool cut to substantially the same approximate radial position for each aperture set in a grid assembly. The tool wear compensator advances the tool during each index a predetermined amount to correct for the tool wear. In one setup, the average tool wear is approximately 0.009 in. for each set of apertures formed.

The grid assembly fixture 39 shown in FIGS. 4 and 5 is positioned in the tank 38, and two blank grid assemblies are loaded into the chucks 42. This is accomplished by removing the front retainer 43, positioning the blank grid assembly over the centering unit 58 and moving both the centering unit 58 and the grid assembly to position the contact flange 25 over the ring-shaped portion 49. The front retainer 43 is then engaged with the hub 44 by the thread 46 and tightened to coaxially clamp the grid assembly in the chuck 42. The grid assembly fixture 39 is then positioned submerged in a tank of dielectric fluid on the electrical discharge machine 33. The use of the centering unit 58 described above is optional in the process.

Two cutting electrodes 36 in a common tool holder 35 are positioned vertically over the grid assemblies mounted in each of the chucks 42. The electrodes 36 are advanced vertically to form one set of radially aligned apertures in each blank grid assembly. The electrode has approximately 0.200 to 0.300-inch cutting stroke in forming one aperture set. After cutting an aperture in each grid blank, the cutting electrodes 36 are retracted to a preset radial position in the grid assembly as determined by the cycle control 40. The retraction of the electrodes operates the cycle control 40 to angularly index the grid assembly and reposition the electrodes 36 to compensate for wear.

After the continuous process is started, the contact rod 79 follows the movement of the electrodes 36. Upon reaching the prescribed radial distance, the whisker switch 82 causes the voltage to the electrodes 36 to be grounded and causes the electrodes 36 to be retracted from the grid assembly. After the electrodes 36 have retracted, the index switch 93 operates the first pneumatic cylinder 73 to angularly index the grid assembly and operates the second pneumatic cylinder 91 to rotate the lead screw 86. Movement of the lead screw 86 advances the electrodes 36 to compensate for the electrode wear that occurred during forming of each aperture. The whisker switch 82 is then reversed in preparation for the next cycle.

Figure 8:
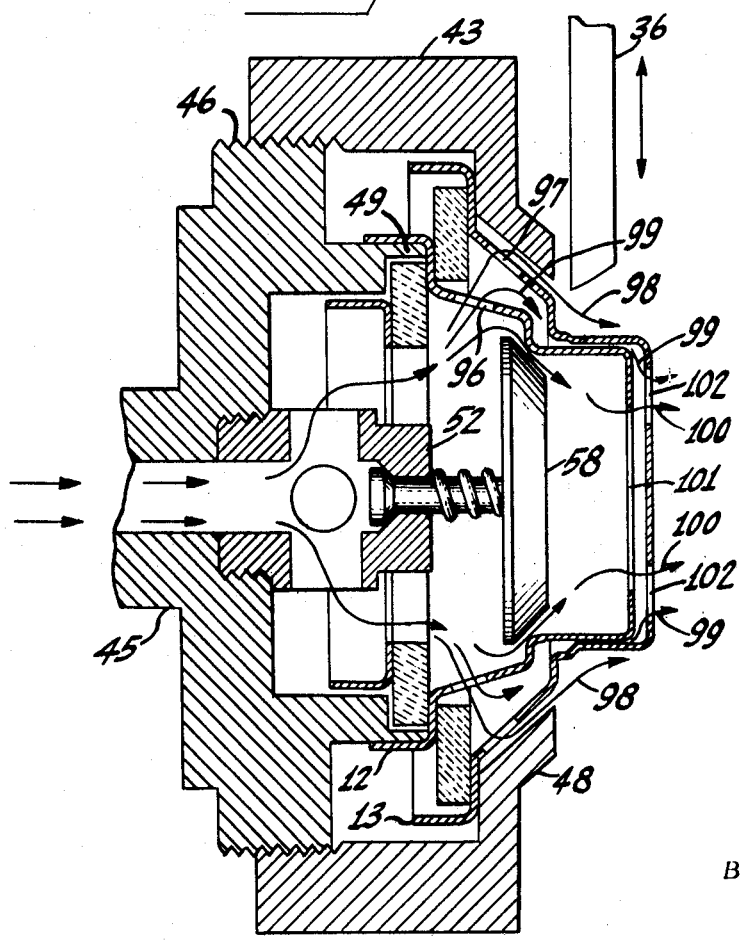
FIG. 8 is an enlarged sectional elevational view of the grid assembly of the tube shown in FIG. 1 including arrows illustrating the direction of dielectric fluid flow.

FIG. 8 illustrates how the particles are removed by the continuing directed flowing fluid during the cutting step. The blank grid assembly is supported with axis horizontal in the grid assembly fixture 39 shown in FIGS. 4 and 5. A stream of dielectric fluid at about 40 p.s.i. pressure exits the nozzle 52 and flows into the central chamber in the grid assembly. The fluid stream then flows axially through the chambers to exit through end openings 101 and 102. The fluid stream sweeps across the cutting region at about 0.65 to 0.95 gallon per minute and collects the small particles produced during the cutting process. The fluid stream flowing in the direction illustrated by the first arrow 98 removes particles produced near the outside surface of the screen grid 13. The fluid streams flowing in the direction illustrated by the first and second arrows 98 and 99 remove particles produced near the inside and outside surfaces of the screen grid 13 after penetration of the cutting electrode. The fluid stream flowing in the direction illustrated by the second arrow 99 removes particles near the outside surface of the blank control grid 12. The combination of the fluid stream flows shown by the second and third arrows 99 and 100 removes particles from the inside and outside surface of the blank control grid 12 produced after partial penetration of the cutting electrode. The directed stream flow through the chambers results in improved surface finish and reduces burrs on the aperture walls.

In cutting an aperture set, the fluid stream, after entering by the nozzle, fills the internal chambers and divides into the following streams. The first fluid stream flows in the direction illustrated by the first arrow 98 through openings 96 in the conical tubular support 21 of the control grid 12, through openings 97 in the conical tubular portion 22 of the screen grid 13, and after deflection by the tapered portion 48 of the chucks 42 flows over the surface of the screen grid 13. The second fluid stream illustrated by the second directional arrows 99 flows through openings 96 in the conical tubular support portion 21 of the control grid 12, between the cylindrical walls 19 and 20 of the grids 12 and 13 and out multiple openings 102 at the end of the screen grid 13. The third fluid stream illustrated by the third directional arrow 100 flows centrally through the internal chamber in the control grid, around the grid centering unit 58, and out through the multiple-end openings 102 and single-end opening 101 in the end of the grids 12 and 13.

It must be realized that this is the idealized flow and that during the progressive forming operation, each formed aperture permits some crossflow between the grids. This crossflow does not affect the cutting as long as sufficient directed flow across the cutting region as illustrated by the directional arrows is obtained. The directed fluid streams eliminate particles remaining between the electrode and the grid in blind areas of stagnant fluid and permit uniform cutting. A filter unit (not shown) is included to remove particles entering the nozzle 52. In previous processes agitated fluid contained particles. Here, recirculated directed fluid has been filtered to remove the particles.

To provide a larger flow past the cutting region, a cylindrical end cap can be used. The cap contains only one opening slightly larger than the cutting electrode and is positioned with the opening over the cutting region. All the flow entering the grid assembly as shown by directional arrows 98, 99 and 100 in FIG. 8 is thereby forced to flow past the cutting region to exit the chambers. This cap serves as a smaller tank submerging the grid assembly in a limited quantity of a directed fluid flow.

This novel process for removing particles produced not only eliminates improperly formed apertures providing improved tube efficiency, it also, by providing the properly cut apertures, permits using a continuous process which was not before possible. This provides the economy of continuous production of one or more grid assemblies without constant operator attendance. In addition, the novel flushing permits faster cutting and less electrode wear.

Although it has been described that the process is used for forming apertures in two concentrically spaced grids, the process is also applicable to a grid assembly having three or more grids.

I claim:
1. In a method for making an electron tube grid assembly, the steps of
   a. mounting in a permanent concentric, insulative-spaced relationship at least one set of a plurality of thin-walled hollow cylindrical electrode grid blanks, said blanks defining internal chambers therebetween and an internal central chamber,
   b. cutting at least one set of radially aligned apertures in said blanks by electrical discharge machining, whereby small particles of material are produced, and
   c. simultaneously with said cutting, flowing a directed stream of dielectric fluid from the central chamber through each of said internal chambers and past at least the cutting region to remove said small particles.

2. The method according to claim 1 wherein said cutting step includes advancing a cutting means to a predetermined radial position to cut said apertures, and said method includes the additional steps of
   d. recycling said cutting means,
   e. compensating for cutting means wear after cutting each of said apertures,
   f. indexing said grid assembly angularly a predetermined amount,
   g. and repeating said steps (b) and (c).

3. The method according to claim 1 wherein step (c) comprises
   simultaneously flowing a directed stream of dielectric fluid over the inner and outer surfaces of each of said plurality of electrode blanks at least through a cutting region during said forming step.

4. The method according to claim 1 wherein step (c) comprises
   i. flowing a stream of fluid axially directed over the exterior surface of the exterior electrode blank of said grid assembly,
   ii. flowing a stream of fluid axially directed through said chamber between each of said plurality of electrode grid blanks,
   iii. flowing a stream of fluid axially directed through the center chamber of the interior electrode blank of said grid assembly, and
   iv. flowing a stream of fluid radially directed through each of said apertures to be enveloped in said axially directed fluid flows.

5. A method according to claim 1 wherein step (b) cutting is achieved
   by causing electrical sparks to arc between a cutting means and an electrode blank through a continuous flowing dielectric fluid.